US011425525B2

(12) United States Patent
Guha et al.

(10) Patent No.: US 11,425,525 B2
(45) Date of Patent: Aug. 23, 2022

(54) PRIVACY PRESERVATION PLATFORM (71) Applicant: Microsoft Technology Licensing, LLC, Redmond, WA (US)

(72) Inventors: Saikat Guha, Bangalore (IN); Venkata N. Padmanabhan, Bangalore (IN); Mudit Jain, Rajasthan (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 438 days.

(21) Appl. No.: 15/871,924

(22) Filed: Jan. 15, 2018

(65) Prior Publication Data
US 2018/0139580 A1 May 17, 2018

Related U.S. Application Data (63) Continuation of application No. 13/103,098, filed on May 8, 2011, now Pat. No. 9,894,479.

(51) Int. Cl.
*H04W 4/02* (2018.01)
*H04W 8/16* (2009.01)

(52) U.S. Cl.
CPC .............. *H04W 4/023* (2013.01); *H04W 8/16* (2013.01)

(58) Field of Classification Search
CPC ......... H04W 4/02; H04W 64/00; H04W 8/10; H04W 24/00; H04W 36/00; H04W 36/0066; H04W 36/28; H04W 36/36; H04W 4/028; H04W 4/22; H04W 52/02; H04W 72/02; H04W 74/02; H04W 76/026; H04W 84/045; H04W 8/08

USPC ................... 455/457, 456.6, 456.3, 567, 418
See application file for complete search history.

(56) References Cited

U.S. PATENT DOCUMENTS

| | | | |
|---|---|---|---|
| 6,823,190 | B2 | 11/2004 | Ford et al. |
| 6,987,839 | B1 | 1/2006 | Lockwood |
| 7,062,279 | B2 | 6/2006 | Cedervall et al. |
| 7,149,504 | B1 | 12/2006 | Weaver et al. |
| 7,583,972 | B2 | 9/2009 | Clipsham |
| 2002/0067308 | A1 | 6/2002 | Robertson |
| 2002/0173317 | A1 | 11/2002 | Nykanen et al. |

(Continued)

OTHER PUBLICATIONS

Patrikakis, et al., "A Framework for Preserving User Privacy and Ensuring QoS in Location Based Services using Non-irreversible Algorithm", Retrieved at <<http://ijcnis.kust.edu.pk/article/viewFile/4034/2859>>, In the Proceedings of International Journal of Communication Networks and Information Security, vol. 1, No. 1, Apr. 2009, pp. 26-33.

(Continued)

*Primary Examiner* — Natasha W Cosme
(74) *Attorney, Agent, or Firm* — Calfee, Halter & Griswold LLP (57) ABSTRACT

A platform that facilities preservation of user privacy with respect to location-based applications executing on mobile computing devices is described. The platform registers triggers that are set forth by location-based applications, where a trigger specifies one or more rules and includes a location constraint. The platform causes a sensor on the mobile computing device to output location data, and the platform determines if the trigger has been satisfied by comparing the location constraint with the location data. If the trigger is satisfied, the platform transmits a callback to the application. Accordingly, the application does not receive location data from the sensor.

20 Claims, 6 Drawing Sheets

(56) References Cited

U.S. PATENT DOCUMENTS

| | | |
|---|---|---|
| 2004/0203863 A1 | 10/2004 | Huomo |
| 2004/0224664 A1 | 11/2004 | Guo |
| 2007/0264974 A1 | 11/2007 | Frank et al. |
| 2008/0200220 A1 | 8/2008 | Jackson |
| 2009/0002188 A1 | 1/2009 | Greenberg |
| 2009/0005061 A1 | 1/2009 | Ward et al. |
| 2010/0004857 A1 | 1/2010 | Pereira et al. |
| 2011/0320550 A1 | 12/2011 | Lawson et al. |
| 2012/0282945 A1 | 11/2012 | Guha et al. |
| 2013/0275963 A1 | 10/2013 | Blaimschein et al. |
| 2014/0113613 A1 | 4/2014 | Huang et al. |

OTHER PUBLICATIONS

Ajam, et al., "Privacy Improvement through Pseudonymity in Parlay X for Location Based Services", Retrieved at <<http://ieeexplore.ieee.org/stamp/stamp.jsp?arnumber=04498246>>, In the Proceedings of Seventh International Conference on Networking, Apr. 30, 2008, pp. 713-718.
Hengartner, et al., "Enhancing User Privacy in Location-Based Services", Retrieved at <<http://www.mathnet.or.kr/mathnet/preprint_file/cacr/2006/cacr2006-27.pdf>>, Aug. 16, 2006, pp. 1-18.
Puttaswamy, et al., "Preserving Privacy in Location-based Mobile Social Applications", Retrieved at <<http://www.cs.ucsb.edu/~krishnap/papers/lbsa-hotmobile10.pdf>>, In the Proceedings of the Eleventh Workshop on Mobile Computing Systems & Applications, Feb. 22-23, 2010, pp. 1-6.
Bettin, et al., "Protecting Privacy Against Location-based Personal Identification", Retrieved at <<http://www.cs.uvm.edu/~xywang/publications/bettini_wang_jajodia_sdm05.pdf>>, In the Proceedings of 2nd VLDB Workshop on Secure Data Management, 2005, pp. 1-14.
"Apple iOS 4 Core Location API", Retrieved at <<http://developer.apple.com/library/ios/documentation/UserExperience/Conceptual/LocationAwarenessPG/LocationAwarenessPG.pdf>>, May 20, 2010, pp. 1-54.
"FTC Testifies on do not Track Legislation", Retrieved at <<http://www.ftc.gov/os/testimony/101202donottrack.pdf>>, Dec. 2, 2010, pp. 1-19.
"Google Latitude API", Retrieved at <<http://code.google.com/apis/latitude/v1/using_rest.html>>, Retrieved Date: Jan. 19, 2011, pp. 1-3.
"Nike + ipod Frequently Asked Questions", Retrieved at <<http://support.apple.com/kb/HT2293.>>, Retrieved Date: Jan. 17, 2011, pp. 1-3.
Ananthanarayanan, et al., "Startrack: a Framework for Enabling Track-Based Applications", Retrieved at <<http://research.microsoft.com/en-us/projects/startrack/startrack.pdf>>, In the Proceedings of the 7th international conference on Mobile systems, applications, and services, 2009, pp. 1-14.
Cornelius, et al., "Privacy-Aware People-Centric Sensing", Retrieved at <<http://pac.cs.dartmouth.edu/pub/dan1.pdf>>, In the Proceeding of the 6th international conference on Mobile systems, applications, and services, Jun. 17-20, 2008, pp. 1-14.
Das, et al., "PRISM: Platform for Remote Sensing using Mobile Smartphone", Retrieved at<<http://research.microsoft.com/pubs/131575/mobi096-das.pdf>>, In the Proceedings of the 8th international conference on Mobile systems, applications, and services, 2010, pp. 1-14.
Enck, et al., "An Information-Flow Tracking System for Realtime Privacy Monitoring on Smartphones", Retrieved at<<http://www.appanalysis.org/tdroid10.pdf>>, In the Proceedings of 9th USENIX Symposium on Operating Systems Design and Implementation, pp. 1-15.
Gaonkar, et al., "Sharing and Querying Content through Mobile Phones and Social Participation", Retrieved at <<http://www.cs.duke.edu/~lpcox/romit-microblog.pdf>>, In the Proceeding of the 6th international conference on Mobile systems, applications, and services Jun. 17-20, 2008, pp. 1-13.
Gruteser, et al., "Anonymous Usage of Location-Based Services through Spatial and Temporal Cloaking", Retrieved at <<http://www.winlab.rutgers.edu/~gruteser/papers/gruteser_anonymous_lbs.pdf>>, In the Proceedings of the 1st international conference on Mobile systems, applications and services, 2003, pp. 1-12.
Gruteser, et al., "On the Anonymity of Periodic Location Samples", Retrieved at <<http://research.nokia.com/files/gruteser_anonymityperiodic.pdf>>, 2005, pp. 1-16.
Guha, et al., "Privad: Practical Privacy in Online Advertising", Retrieved at <<http://adresearch.mpi-sws.org/privad-performance.pdf>>, 2011, pp. 1-14.
Haridasan, et al., "A Scalable Infrastructure for Track-Based Applications", Retrieved at <<http://www.usenix.org/.event/osdi10/tech/slides/haridasan.pdf>>, In the Proceedings of the 9th USENIX conference on Operating systems design and implementation, 2010, pp. 1-14.
Hoh, et al., "Virtual Trip Lines for Distributed Privacy-Preserving Traffic Monitoring", Retrieved at <<http://traffic.berkeley.edu/conference%20publications/virtual_trip_lines.pdf>>, In the Proceeding of the 6th international conference on Mobile systems, applications, and services, Jun. 17-20, 2008, pp. 1-14.
Jaiswal, et al., "A Decentralized Matching Service for Privacy in Location Based Services", Retrieved at <<http://conferences.sigcomm.org/sigcomm/2010/papers/mobiheld/p51.pdf>>, In the Proceedings of the second ACM SIGCOMM workshop on Networking, systems, and applications on mobile handhelds, Aug. 30, 2010, pp. 51-56.
Lin, et al., "Energy-Accuracy Trade-Off for Continuous Mobile Device Location", Retrieved at <<http://research.microsoft.com/pubs/120831/aloc_kansal.pdf>>, In the Proceedings of the 8th international conference on Mobile systems, applications, and services, Jun. 15, 2010, pp. 1-14.
Mohan, et al., "Rich Monitoring of Road and Traffic Conditions using Mobile Smartphones", Retrieved at <<http://research.microsoft.com/en-us/um/people/padmanab/papers/Nericell-SenSys2008.pdf>>, In the Proceedings of the 6th ACM conference on Embedded network sensor systems, Nov. 2008, pp. 1-32.
Naumov, et al., "An Evaluation of Inter-Vehicle Ad Hoc Networks Based on Realistic Vehicular Traces", Retrieved at <<http://www.rainer-baumann.ch/public/mobihoc06.pdf>>, In the Proceedings of the 7th ACM international symposium on Mobile ad hoc networking and computing, May 22-25, 2006, pp. 108-119.
Paek, et al., "Energy-Efficient Rate-Adaptive GPS-Based Positioning for Smartphones", Retrieved at <<http://enl.usc.edu/papers/cache/Paek10a.pdf>>, In the Proceedings of the 8th international conference on Mobile systems, applications, and services Jun. 15-18, 2010, pp. 1-16.
Pera, et al., "Finding Similar RSS News Articles Using Correlation-Based Phrase Matching", Retrieved at <<http://faculty.cs.byu.edu/~dennis/papers/PhraseMatch.pdf>>, In the Proceedings of the 2nd international conference on Knowledge science, engineering and management, 2007, pp. 1-12.
Schulman, et al., "A Practical Approach to Energy-Aware Cellular Data Scheduling", Retrieved at <<http://www.cs.umd.edu/~schulman/docs/mobicom10-bartendr.pdf>>, Sep. 20-24, 2010, pp. 1-12.
Zhuang, et al., "Improving Energy Efficiency of Location Sensing on Smartphones", Retrieved at <<http://www.deutsche-telekom-laboratories.com/~kyuhan/papers/MobiSys10Kim.pdf>>, In the Proceedings of the 8th international conference on Mobile systems, applications, and services, Jun. 15-18, 2010, pp. 1-15.
"Non-Final Office Action for U.S. Appl. No. 13/103,098", dated Jun. 27, 2013, 18 pages.
"Response to the Non-Final Office Action for U.S. Appl. No. 13/103,098", Filed Date: Nov. 27, 2013, 12 pages.
"Final Office Action for U.S. Appl. No. 13/103,098", dated Apr. 11, 2014, 21 pages.
"Response to the Final Office Action for U.S. Appl. No. 13/103,098", Filed Date: Oct. 13, 2014, 14 pages.
"Non-Final Office Action for U.S. Appl. No. 13/103,098", dated Apr. 14, 2015, 32 pages.
"Response to the Non-Final Office Action for U.S. Appl. No. 13/103,098", Filed Date: Oct. 14, 2015, 17 pages.
"Non-Final Office Action for U.S. Appl. No. 13/103,098", dated Feb. 2, 2016, 26 pages.

(56) References Cited

OTHER PUBLICATIONS

"Response to the Non-Final Office Action for U.S. Appl. No. 13/103,098", Filed Date: Aug. 2, 2016, 13 pages.
"Final Office Action for U.S. Appl. No. 13/103,098", dated Nov. 21, 2016, 26 pages.
"Response to the Final Office Action for U.S. Appl. No. 13/103,098", Filed Date: May 22, 2017, 15 pages.
"Notice of Allowance and Fees Due for U.S. Appl. No. 13/103,098", dated Oct. 6, 2017, 7 pages.

PRIVACY PRESERVATION PLATFORM

RELATED APPLICATION

This application is a continuation of U.S. patent application Ser. No. 13/103,098, filed on May 8, 2011, and entitled "PRIVACY PRESERVATION PLATFORM", the entirety of which is incorporated herein by reference.

BACKGROUND

Popularity of mobile computing devices has increased dramatically over a relatively short period in time, which is at least partially due to decrease in price of such mobile computing devices. These mobile computing devices, such as smart phones, are highly sophisticated computing devices that can execute a multitude of different types of applications. Because mobile computing devices typically travel with the owner thereof, many applications that have been developed for execution on mobile computing devices leverage location (of the mobile computing device or a contact's mobile computing device) to perform a location-based service. Exemplary applications that leverage location include search applications, advertising applications, social networking applications, multi-player games, amongst others. For instance, a search application can leverage a location of a user to provide search results that are relevant to the location of the user. In another example, a social networking application that can be executed on a mobile computing device can inform a user thereof when contacts of such user or contacts of contacts) are within a predefined distance of the user.

Generally, mobile computing devices include a hardware sensor-type device that can be configured to output location information, such as a global positioning system sensor. Conventionally, an application executing on a mobile computing device can directly access the sensor by way of an exposed application programming interface, thereby allowing the application (which is typically untrusted) to obtain latitude/longitude coordinates of the mobile computing device regardless of whether the current location is relevant to a service provided by the application. Subsequent to the application receiving latitude/longitude coordinates of the user by way of the sensor, the application has unrestricted use of such coordinates. Studies have shown that approximately 50% of the most popular location-based applications for smart phones transmit location information to a third party, wherein the third party fails to provide a service that is critical to the service provided by the location-based applications. Therefore, unbeknownst to the user, an application executing on a mobile computing device may acquire latitude/longitude coordinates of the mobile computing device and then transmit these coordinates to a third party, which can construct location traces for the user. Generally, users feel some entitlement to privacy with respect to their movements; the aforementioned transmittal of latitude/longitude coordinates to third parties is in contrast to such entitlement.

Additionally, in conventional mobile computing devices, several applications executing on a mobile computing device may request location information from the sensor by way of the aforementioned API. In some cases, the applications also communicate location information by way of a cellular data network, such as in the case of social networking applications. Accordingly, numerous applications can indiscriminately request location data from the sensor and transmit such location data to another device by way of a network connection. This can cause a significant amount of energy to be utilized on the mobile computing device, thereby significantly reducing an amount of time that the user can utilize the mobile computing device prior to such device requiring charging.

SUMMARY

The following is a brief summary of subject matter that is described in greater detail herein. This summary is not intended to be limiting as to the scope of the claims.

Various technologies pertaining to preserving user privacy in connection with location-based applications executing on a mobile computing device are described in detail herein. With more particularity, a computing platform is described herein that facilitates preventing location-based applications from indiscriminately requesting and obtaining latitude/longitude coordinates from a sensor on a mobile computing device. The platform includes an operating system that can be executed on a mobile computing device, which, for instance, may be a smart phone. The operating system exposes an application programming interface to location-based applications that are installed on the mobile computing device.

The application programming interface is configured to allow application instances executing on the mobile computing device to specify triggers that can be registered with the platform. A trigger, as used herein, can be a set of rules pertaining to one or more attributes. For location-based applications, at least one of these rules can be a location constraint. Using such application programming interface, an instance of an application can specify a location constraint as being an absolute location (such as latitude/longitude coordinate, a street address, etc.), a range pertaining to an absolute location (e.g., "within two miles of location X"), or a relative location (e.g., "within two miles of a current location"). It is to be understood that the location constraint in a trigger may refer to the geographic location of the mobile computing device upon which the location-based application is installed and/or may refer to a geographic location of another mobile computing device that is utilized by a trusted contact of the user of the mobile computing device (or a contact of the contact). For instance, in a social networking application, the user of the mobile computing device may wish to receive an indication that a particular contact is within a threshold distance of the current location of the user. Therefore, the instance of the application can register a trigger that includes a rule that specifies the identity of the contact and the location constraint.

Subsequent to triggers being registered, the platform can request location data from the mobile computing device or mobile computing devices. Accordingly, rather than an untrusted application acquiring latitude/longitude coordinates, a trusted platform acquires the location data from the sensor on the mobile computing devices. The trusted platform can then be configured to ascertain whether a trigger is satisfied based at least in part upon a comparison between the location constraint of the application and the location data received from the sensor. Additionally, the platform is configured to perform any suitable location conversion that must be performed to allow for an appropriate comparison to be undertaken between location data received from a sensor and a location constraint of a trigger, which gives application developers additional flexibility when designing applications. If the platform ascertains that the constraint is satisfied, then the platform can issue a callback to that instance of the application indicating to such instance of the application that the particular trigger has been satisfied. The application may then execute in an appropriate manner responsive to receiving the indication that the trigger has been satisfied.

Other aspects will be appreciated upon reading and understanding the attached figures and description.

DETAILED DESCRIPTION

Various technologies pertaining to location-based applications executing on a mobile computing device will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Figure 1:
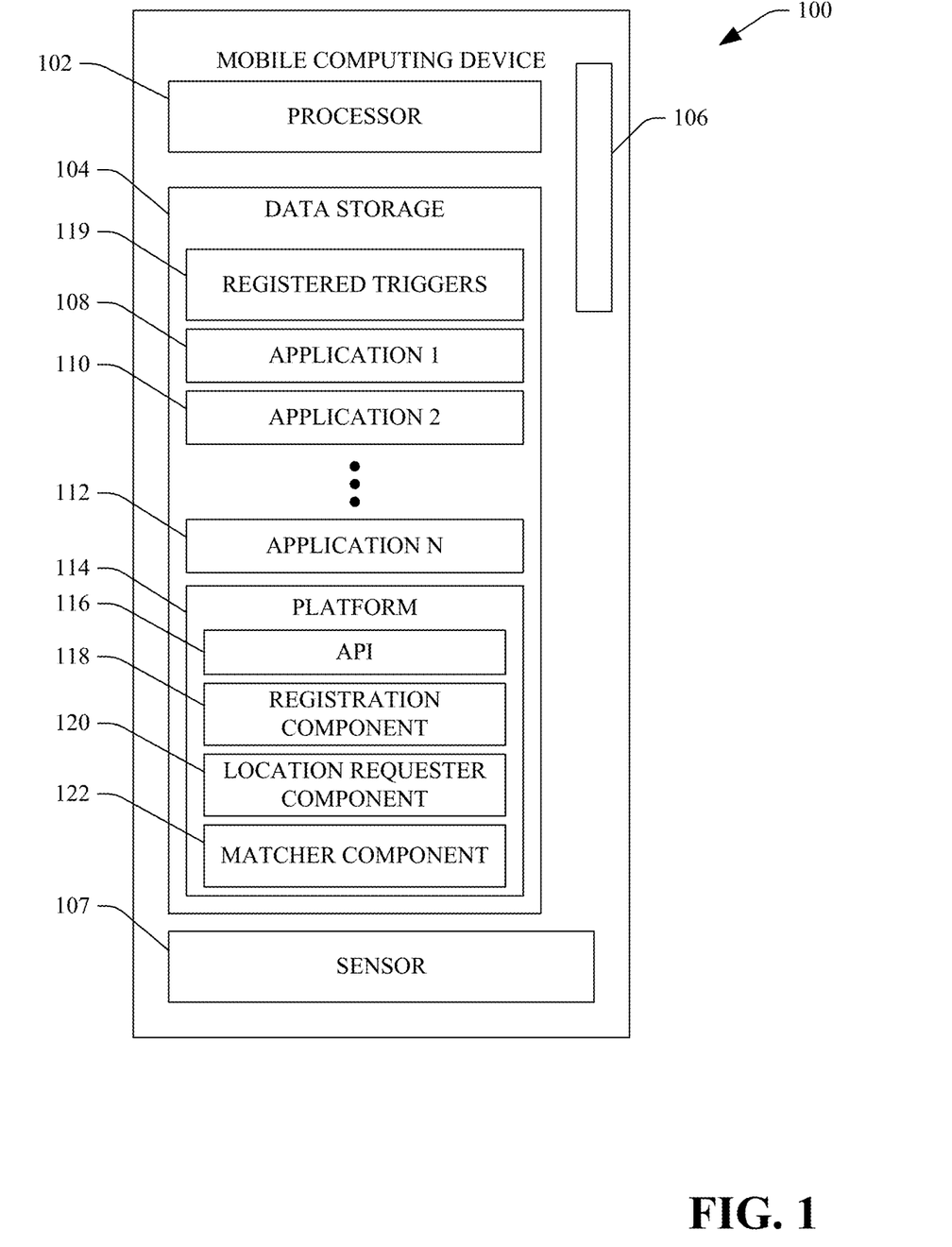
FIG. 1 is a functional block diagram of a mobile computing device that comprises a platform that facilitates preservation of user privacy.

Referring now to FIG. 1, an exemplary mobile computing device 100 is illustrated. Pursuant to an example, the mobile computing device 100 can be a mobile telephone (such as a smart phone), a mobile media player, a mobile gaming console, a mobile tablet computing device, a laptop computer, or the like. The mobile computing device 100 comprises a processor 102 and data storage 104. The data storage 104 may be memory, a hard drive, extendible storage such as a flash drive, Secure Digital card, or the like. The data storage 104 comprises instructions that are executable by the processor 102 that cause the mobile computing device 100 to perform particular functions. The mobile computing device 100 may further comprise an antenna 106 that can be employed in connection with wirelessly transmitting and receiving data over a suitable wireless network, such as a cellular network, a local area network, or other suitable network. Moreover, the mobile computing device 100 can comprise a sensor 107 that is configured to output data that is indicative of a current location of the mobile computing device 100. For instance, the sensor 107 may be a global positioning system sensor, a sensor that is configured to compute a location through triangulation, or other suitable sensor.

The data storage 104 comprises a plurality of application instances that are installed on the mobile computing device 100. These application instances will be referred to herein as applications 108-112. For example, the applications 108-112 can be location-based applications, wherein a location-based application is an application that is configured to utilize location of the mobile computing device 100 and/or location of another mobile computing device to provide a service that is based at least partially on such location(s). Exemplary types of applications that can be deemed location-based applications will be described below.

The data storage 104 additionally comprises a platform that facilitates preservation of user privacy with respect to location data pertaining to the mobile computing device 100. For example, an operating system installed on the mobile computing device 100 may comprise the platform 114. For instance, the platform 114 can include an application programming interface (API) 116 that is exposed to the plurality of applications 108-112. In general, the API 116 allows the applications 108-112 to define triggers that, when satisfied, cause the applications to perform a particular function. As the applications 108-112 are location-based applications, the triggers include a location constraint. A location constraint may be an absolute location such as in the form of latitude/longitude coordinates, a street address, a general area, or the like. In another example, a location constraint may be a location relative to a current location of the mobile computing device 100 or a location of another mobile computing device (e.g., "within 2 miles of current location").

The platform 114 may further comprise a registration component 118 that can register triggers with the platform 114, such that registered triggers 119 are retained in the data storage 104 of the mobile computing device 100. Pursuant to an example, the first application 108 may be configured to allow the user of the mobile computing device 100 to generate a grocery list, and the user may wish that the grocery list be presented to the user by the application 108 when the user is within two miles of a specified grocery store. Accordingly, the application 108, through the exposed API 116, can register a trigger through utilization of the registration component 118, wherein the location constraint of the trigger indicates that the current location of the mobile computing device 100 must be within 2 miles of the location of the grocery store for the trigger to be satisfied.

The platform 114 may additionally comprise a location requester component 120 that can cause the sensor 107 to output data that is indicative of a location (e.g., current location or cached location) of the mobile computing device 100. It is to be noted that the applications 108-112 do not directly request or acquire location data from the sensor 107. Rather, the platform 114 (which may be a part of the trusted operating system) is configured to request and acquire current location of the mobile computing device 100 from the sensor 107. The location requester component 120 can request location data from the sensor 107 periodically, randomly or pseudo-randomly, as a function of an expected remaining time that a battery that powers the mobile computing device 100 will retain a sufficient charge to allow for continued operation of the mobile computing device 100, based at least in part upon a previous or most recent proximity of the mobile computing device 100 to locations corresponding to location-based constraints of triggers, etc.

The platform 114 further comprises a matcher component 122 that compares location constraints in the registered triggers 119 with the location obtained by the location requester component 120 from the sensor 107 and ascertains whether any of the registered triggers 119 have been satisfied based at least in part upon such comparison. It is to be understood that the registered triggers 119 may include numerous rules that must be satisfied, wherein the location constraint is but one of such rules. Other exemplary rules pertaining to certain attributes that are supported by the API 116 will be described below. If the matcher component 122 ascertains that a trigger has been satisfied, the matcher component 122 can cause a callback to be issued to the application corresponding to the trigger. The application may then perform an appropriate function responsive to receiving the callback. Continuing with the example provided above pertaining to the first application 108, the matcher component 122 can determine that the user of the mobile computing device 100 has arrived within 2 miles of the grocery store by comparing the location constraint of the trigger with location data output by the sensor 107. The matcher component 122 can generate a callback to the first application 108, and responsive to receiving the callback the first application 108 can present the grocery list to the user of the mobile computing device 100.

The matcher component 122 can determine that the location constraint of the trigger has been satisfied by comparing the location constraint of the trigger with the location data acquired from the sensor 107 by the location requester component 120. If the raw location data (e.g., latitude/longitude coordinates) cannot be directly compared with a location constraint of a trigger, the matcher component 122 can convert at least one of the raw location data acquired by the location requester component 120 or the location constraint to a format that allows for comparison. For example, the location constraint may be a street address while the location data output by the sensor 107 may be latitude/longitude coordinates. The matcher component 122 can convert the street address to latitude/longitude coordinates to perform an appropriate comparison.

It can thus be ascertained that the applications 108-112 do not have indiscriminate access to the current location of the mobile computing device 100. Rather, the applications 108-112 are only aware of location of the mobile computing device 100 when specified triggers have been satisfied. Therefore, in effect, the applications 108-112 only receive indications of locations when such locations are required for the applications 108 to 112 to operate as desired. This aids in preventing the applications 108-112 from acquiring and sharing location traces pertaining to the mobile computing device 100 without the knowledge of the user.

In the exemplary mobile computing device 100 shown in FIG. 1, it is to be understood that the platform 114 that facilitates preservation of privacy is entirely located on the mobile computing device 100. Therefore, the platform 114 in the embodiment shown in FIG. 1 is particularly useful when the applications 108-112 do not utilize data or locations from other computing devices. Furthermore, the platform 114 as illustrated in FIG. 1 can be particularly useful when the mobile computing device 100 has established a peer-to-peer connection with another mobile computing device, and utilizes data from the another mobile computing device.

Additionally, the matcher component 122 has been described above as comparing location data output from the sensor 107 with one or more location constraints. It is to be understood, however, that the matcher component 122 can be configured to compare location data received from any suitable source with one or more location constraints. Other exemplary sources of location data can include an algorithm that estimates location of the mobile computing device 100 based upon one or more parameters (e.g., recent location, velocity of travel, direction of travel, . . . ), a user that manually inputs a location, or the like.

Figure 2:
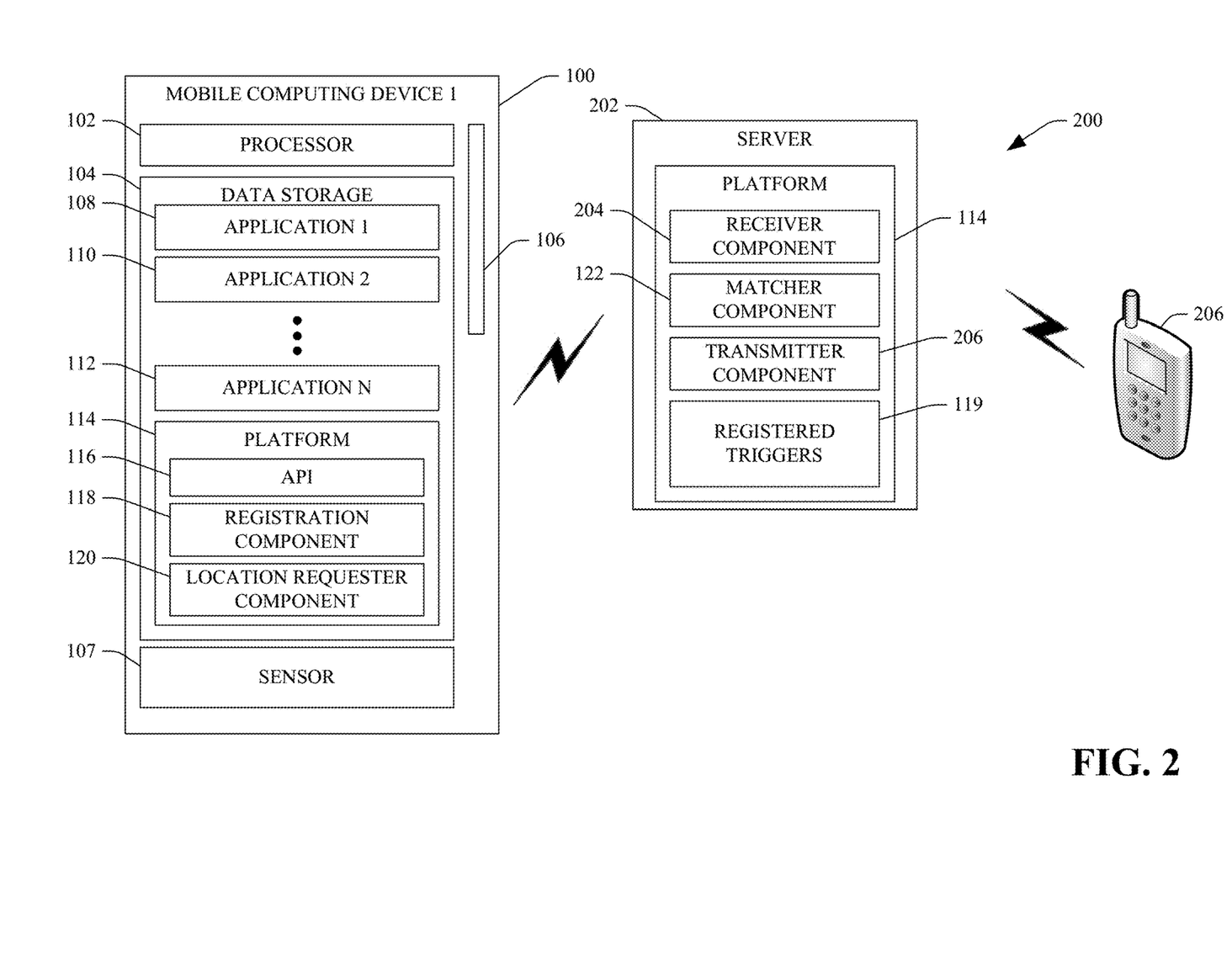
FIG. 2 is a functional block diagram of an exemplary system that facilitates preserving privacy of a user of a mobile computing device.

Referring now to FIG. 2, an exemplary system 200 that facilitates preservation of user privacy with respect to user location is illustrated. The exemplary system 200 comprises the mobile computing device 100, which includes the processor 102, the data storage 104, the antenna 106, the applications 108-112 executing on the mobile computing device 100, the platform 114, the API 116, the registration component 118, the location requester component 120, and the sensor 107, which can act in conjunction as described above. The system 200 additionally includes a server 202 that is in communication with the mobile computing device 100 by way of a suitable network connection. For instance, the network connection may be a cellular network data connection or other suitable connection. The server 202 may be a portion of a cloud computing system.

The server 202 additionally comprises the platform 114—accordingly, the platform 114 is distributed between the mobile computing device 100 and the server 202. The platform 114 on the server-side comprises a receiver component 204 that receives location data output by the sensor 107 on the mobile computing device 100. As described above, the location requester component 120 can be in communication with the sensor 107 and can cause the sensor 107 to output location data. This location data may be received by the receiver component 204. For example, the location requester component 120 can cause the location data to be transmitted by way of the network connection to the server 202, wherein the receiver component 204 is configured to receive such location data. While in this exemplary embodiment the location requester component 120 is shown as residing on the mobile computing device 100, it is to be understood that the location requester component 120 may reside on the server 202. In such an embodiment, the location requester component 120 can transmit a message to the mobile computing device 100 that causes the sensor 107 to output the location data, which is then transmitted back to the server 202 by way of the network connection.

The platform 114 on the server-side additionally comprises the registered triggers 119 that have been registered by way of the registration component 118 from the plurality of applications 108-112 on the mobile computing device 100. In other words, the applications 108-112 can register triggers via the API 116 through utilization of the registration component 118. The registration component 118 then causes triggers registered by the applications 108-112 to be transmitted for retention in the cloud (e.g., at least partially on the server 202).

The system 200 additionally comprises a second mobile computing device 206. While not shown, the second mobile computing device 206 may also comprise one or more location-based applications and the client-side portion of the platform 114 (e.g., the API 116, the registration component 118, and the location requester component 120). The second mobile computing device 206 can be in communication with the server 202 by way of another network connection. The API 116 will now be described in greater detail.

In addition to preserving privacy with respect to location-based applications that perform a function responsive to receiving a location, the API 116 supports preservation of user privacy with respect to content tagging applications, wherein an application is configured to tag certain content (e.g., images) with location data. Types of calls that location-based applications can make into the platform 114 include the following: 1) calls for registering items; 2) calls for adding attributes; 3) and calls for registering triggers. The API 116 also supports callbacks made by the platform 114 to location-based applications.

Calls for registering items can be utilized to create a user item or a content item. A user item specifies an application-specific identity of a user of the application on either the first mobile computing device 100 or the second mobile computing device 206 (e.g., a username, telephone number) as well as an indication that a callback to the instance of the application executing on the mobile computing device 100 is desired if the platform 114 finds that a trigger corresponding to the user item has been satisfied. A content item specifies certain content, such as a street address, URL, an image, a file, or the like. A content item is not associated with a callback. For example, a content item may be generated, for instance, by an application that is configured to tag content with location data, such that there is no need for a callback.

Calls for adding attributes can be utilized to attach location data and/or application-specific attributes to user items and/or content items. With respect to calls for adding attributes, location data can be specified as an absolute location or as a current location (e.g., through a reserved keyword). This can enable, for instance, a location-tagging application to request that content be tagged with a "current location." The platform 114 can acquire the current location and populate a template output by the application. Accordingly, the application need not actually receive the location of the mobile computing device 100. Application-specific attributes can be opaque to the platform 114. Location data and/or application-specific attributes can be set to expire after a specified time.

Calls for setting triggers can be utilized to set triggers based upon location and application-specific attributes. For instance, when an application wishes to set a trigger, the application can register location and application-specific triggers against a user item. For location-based triggers (location constraints), the application can specify an absolute location or a location relative to the dynamic location of the mobile computing device 100 (e.g., "within 2 miles of a current location"). For relative locations, as the mobile computing device 100 geographically moves, the platform 114 can dynamically recompute the trigger region. Application-specific triggers can be treated opaquely using the exact match operation. The calls for setting triggers can additionally allow the application to specify whether satisfying the triggers is mandatory, preferred, undesired, or forbidden. For instance, for a trigger to be satisfied, a user item or content item must match all mandatory triggers and must not match any of the forbidden triggers. In the case of multiple matching items, preference can be determined as a function of number of matching preferred and undesired triggers.

As described above, the platform 114 can issue a callback to an application when a trigger specified by the application has been satisfied. Accordingly, the application is not provided with location data from the sensor 107, but is instead provided with an indication that a trigger has been satisfied.

Accordingly, the first mobile computing device 100 and the second mobile computing device 206 can transmit user items, content items, triggers, and/or location data that is indicative of current locations of the first mobile telephone 100 and the second mobile telephone 206 to the server 202. Moreover, the first mobile computing device 100 and the second mobile computing device 206 can register user items or content items with triggers or attributes.

The platform 114 on the server side additionally comprises the matcher component 122 that receives user items and/or content items from the mobile computing devices 100 and 206 that have attributes (location attributes or application-specific attributes) assigned thereto. The matcher component 122 can additionally receive location data from mobile computing devices 100 and 206, even if not included in a content item or user item. The matcher component 122 compares the user items, content items, and location data with the registered triggers 119 and ascertains whether a registered trigger (from one or more application instances installed on the mobile computing device 100 and/or the second mobile computing device 206) has been satisfied based at least in part upon the comparison. If the matcher component 122 ascertains that a trigger has been satisfied (based on location data from one or more of the mobile computing device 100 or the second mobile computing device 206), then a transmitter component 208 in the platform 114 on the server side can cause a callback to be issued to the application that corresponds to the satisfied trigger on the appropriate mobile computing device.

As described above, the API 116 and the registration component 118 can act in conjunction to allow triggers to be registered that may depend upon several attributes, as well as location data pertaining to other mobile computing devices that utilize the platform 114. For instance, the first application 108 executing on the mobile computing device 100 may be an application that is configured to provide the user of the mobile computing device 100 with a grocery list generated by the user of the second mobile computing device 206 on the second mobile computing device 206 when the user of the mobile computing device 100 is within a particular distance of a grocery store specified by the user of the mobile computing device 100 or the user of the second mobile computing device 206. Accordingly, for example, the first application 108 can register a trigger that specifies that a callback to the application is desired if a content item pertaining to the grocery store has been generated by the user of the second mobile computing device 206 and the first mobile computing device 100 is within a predefined area of the grocery store. This trigger can be retained in the registered triggers 119 on the server 202.

The user of the second mobile computing device 206 may generate a grocery list (content item) by way of an instance of the first application 108 executing on the second mobile computing device 206. The application on the second computing device 206 can cause a content item to be generated that specifies a location (the location of the grocery store), a geographic range that surrounds the location, and an attribute identifying the user of the second mobile computing device 206. Alternatively, the user of the mobile computing device 100 can specify the location and/or range. The mobile computing device 100 may thereafter physically enter the specified range and the location requester component 120 can transmit location data to the server 202. There, the matcher component 122 can determine that the trigger is satisfied (that the mobile computing device 100 is within the specified range of the grocery store and that a user identity corresponding to a user of the second mobile computing device 206 has created the content). The transmitter component 206 may than issue a callback to the first application 108 informing the first application 108 that the trigger has been satisfied. Additionally, the transmitter component 206 can cause the grocery list generated at the second mobile computing device 206 to be transmitted to the mobile computing device 100 where it can be presented to the user by way of the first application 108 executing on the first mobile computing device 100.

Several exemplary location-based applications that can be executed by the mobile computing devices 100 and/or 206 will now be described. It is to be understood that the applications described herein are exemplary in nature and are not intended to be an exhaustive list. Pursuant to an example, at least one of the applications 108 to 112 executing on the mobile computing device 100 may be a location-based social networking application that is configured to inform the user of the mobile computing device 100 when a registered contact (friend) or a contact of a contact is within a predefined range of the mobile computing device 100. The application executing on the mobile computing device 100 can register the contacts of the user of the mobile computing device 100 by way of the API 116 and the registration component 108. For instance, the application can generate user items that define identities of the contacts and possibly contacts of the contacts) and location triggers that specify a relative area with respect to the location of the user, indicating that the user wishes to be notified when one of the contacts is within a certain geographic range of the user. The receiver component 204 on the server 202 receives location data from the mobile computing device 100, and the mobile computing devices of the contacts of the user of the mobile computing device 100 (as well as their contacts). The matcher component 122 searches for nearby contacts of the user of the mobile computing device 100 by comparing location data received from a plurality of mobile computing devices with the location data received from the mobile computing device 100 in view of the trigger. Once the matcher component 122 finds that the trigger has been satisfied, the application is notified by way of a callback such that the application can notify the user of the mobile computing device 100 that a friend of such user is nearby.

Another exemplary application is a location-based content tagging application. Such an application facilitates tagging content such as status updates, photographs, etc. with location data. Tagging content with location data is a prerequisite for many applications including local search. Utilizing the technologies described herein, such application can register content (such as an image, pointer, URL, etc.) as a content item and assign a location attribute thereto. When a user of the application wishes to tag content with a current location, the location requester component 120 requests the current location from the sensor 107 and automatically performs the tagging without providing the current location of the mobile computing device 100 to the application. Alternatively, the application can register location-based triggers at different locations where content may be desirably tagged.

Another exemplary application may be a local search application, which is an application that locates content (businesses, photos, blogs) tagged at the location of the user of the mobile computing device 100 or at a specified location. Here, the provider of the content (the content tagging application) registers content with location attributes and other attributes used to find content (e.g., search keywords extracted from the content). The local search application can then register a search query from a user with the platform as a user item, such that the application-specific triggers are terms of the query and the location trigger is an area relative to a current location of the user. The platform can then deliver to the application matching content where the query terms issued by the user match the keyword attributes assigned to the content, and the current location of the user matches the location attributes assigned to the content.

Still yet another exemplary application that can be utilized by the system 200 includes location recommendation applications which are configured to recommend nearby local businesses based on other businesses or places the user of the mobile computing device 100 has frequented. Here, a pair wise correlation between locations can be constructed. Such an application can register location pairs much the same way it does location-based tagged content. For instance, if the user frequents two businesses A and B, the application can register the content "recommend B" with A's location as the location attribute and vice versa. When another user visits A, the platform delivers all matching recommendations registered by other users to the application, which can then find popular recommendations and suggest them to the user.

Yet another location-based application may be a location based advertising application. Such an application facilitates tagging businesses with location data, surfacing that content in response to local search queries, or as local recommendations, and potentially indicating to the user if any of his friends or friends of friends have an opinion about the business. Still yet another exemplary application is a navigation application that provides navigation directions, for instance, to the user. This can be accomplished by causing the application to compute a route between two specified locations and registering triggers corresponding to points along such route. When such trigger is satisfied, the transmitter component 206 can transmit a call back to the application.

Figure 3:
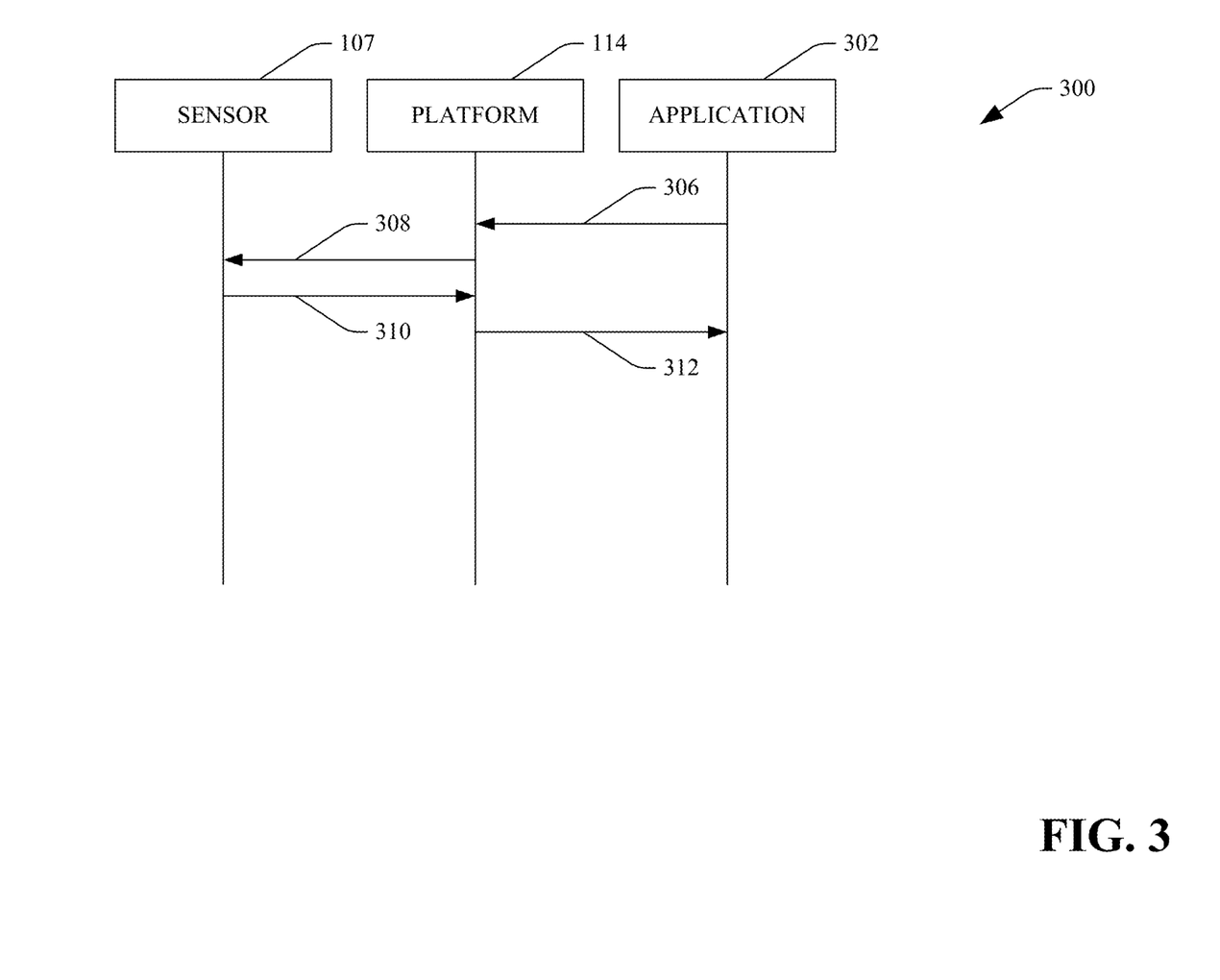
FIG. 3 is a control flow diagram that illustrates communications undertaken between an instance of an application executing on a mobile computing device, a privacy preserving platform, and a low-level sensor on the mobile computing device.
Figure 4:
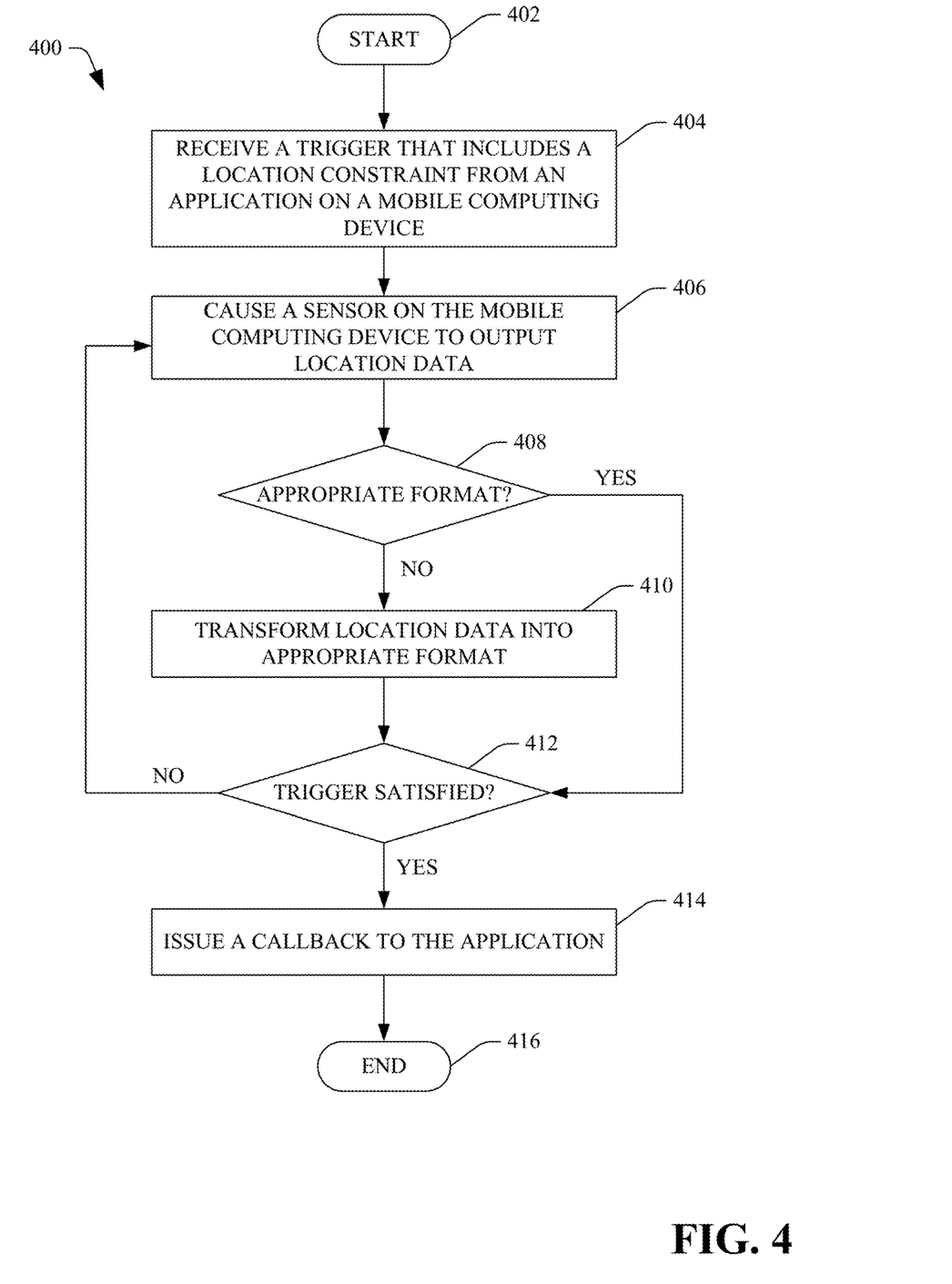
FIG. 4 is a flow diagram that illustrates an exemplary methodology that facilitates preservation of privacy of a user of a mobile computing device.
Figure 5:
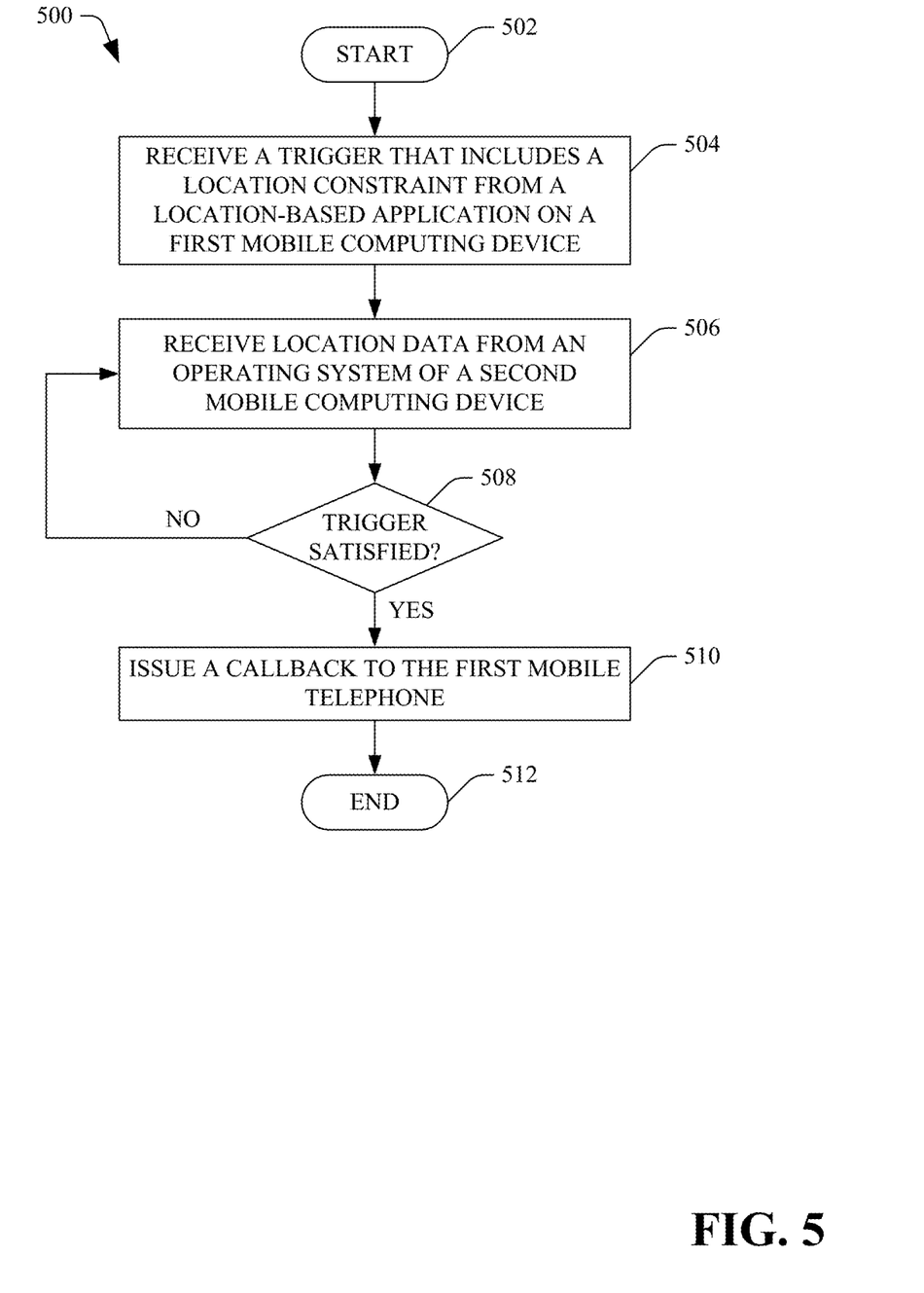
FIG. 5 is a flow diagram that illustrates an exemplary methodology for calling back to an application executing on a mobile computing device when a trigger registered by such application has been satisfied.

With reference now to FIGS. 3-5, various exemplary methodologies and a control flow diagram are illustrated and described. While the methodologies and control flow diagram are described as being a series of acts that are performed in a sequence, it is to be understood that the methodologies and control flow diagram are not limited by the order of the sequence. For instance, some acts may occur in a different order than what is described herein. In addition, an act may occur concurrently with another act. Furthermore, in some instances, not all acts may be required to implement a methodology or control flow diagram described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies and control flow diagram may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

With reference now to FIG. 3, an exemplary control flow diagram 300 that illustrates communications between an application 302 executing on a mobile computing device, the platform 114, and the sensor 107 of a mobile computing device. At 306, the application 302 registers one or more triggers with the platform 114 by way of the API 116 as described above. Again, such trigger may include a plurality of attributes as well as a location constraint. These triggers can be automatically registered by the application 302 or can be registered by way of the application 302 by a user of the application. The platform 114 retains these triggers for comparison of other data at a later point in time.

At 308, the platform 114 requests location data from the sensor 107, which may be in the form of latitude/longitude coordinates. At 310, the sensor 107 provides the platform 114 with the location data. The platform 114 is then configured to compare the location data provided by the sensor 107 with the triggers defined by the application 302. If a trigger registered by the application 302 has been satisfied based at least in part upon the location data provided by the sensor 107, the platform 114 transmits a call back to the application 302 at 312. It can therefore be noted that the application 302 does not directly acquire latitude/longitude coordinates from the sensor 107 and is only provided with a callback when a trigger registered by the application 302 has been satisfied.

With reference now to FIG. 4, an exemplary methodology 400 that facilitates execution of a location-based application on a mobile computing device is illustrated. The methodology 400 starts 402, and at 404 a trigger that includes a location constraint is received from a first instance of a location-based application executing on a mobile computing device. The location-based application may be any of the location-based applications described above or some other suitable location-based application.

At 406, location data is received from a sensor on the mobile computing device. In other words, the sensor on the mobile computing device can be caused to output location data that is indicative of a current location of the mobile computing device. For example, this location data may be in the form of latitude/longitude coordinates.

At 408, a determination is made regarding whether the received location data from the sensor is in an appropriate format. For instance, a location constraint included in a trigger registered by a location-based application may be in the form of a street address, a relative location, or the like, while the location received from the sensor may be latitude/longitude coordinates. If the location data received from the sensor is not in the appropriate format then at 410, the location data is transformed into the appropriate format. Alternatively, the location data in the trigger may be transformed into another format. For instance, the location data may be transformed into a street address corresponding to a nearest residence or business to the mobile computing device. If it is determined at 408 that the location data received from the sensor is in the appropriate format or subsequent to the location data being transformed in the appropriate format, then at 412 a determination is made regarding whether the registered trigger has been satisfied. This determination is made based at least in part upon a comparison between a location constraint in the trigger and a location received from the sensor on the mobile computing device. If it is determined that a trigger has not been satisfied then the methodology returns to 406 where location data is monitored.

If it is determined at 412 that the trigger has been satisfied, then at 414 a callback is issued to the application executing on the mobile computing device indicating to the application that the trigger has been satisfied. The application may then output data to the user responsive to receiving the callback. The methodology 400 completes at 416.

Referring now to FIG. 5, another exemplary methodology 500 that facilitates preserving user privacy when location-based applications are executing on mobile computing devices is illustrated. The methodology 500 starts at 502, and at 504 a trigger that has a location constraint is received from a first instance of an application executing on a first mobile computing device.

At 506, location data is received from a second mobile computing device, wherein such location data is indicative of a geographic location of the second mobile computing device.

At 508, a determination is made regarding whether a trigger has been satisfied based at least in part upon a comparison between the location constraint of the trigger and the location data received at 506. If at 508 it has been determined that the trigger has not been satisfied, than the methodology 500 returns to 506. If it is determined, however, that the trigger has been satisfied, then at 510 a callback is issued to the first mobile computing device in response to determining that the trigger has been satisfied. The methodology 500 completes at 512.

Figure 6:
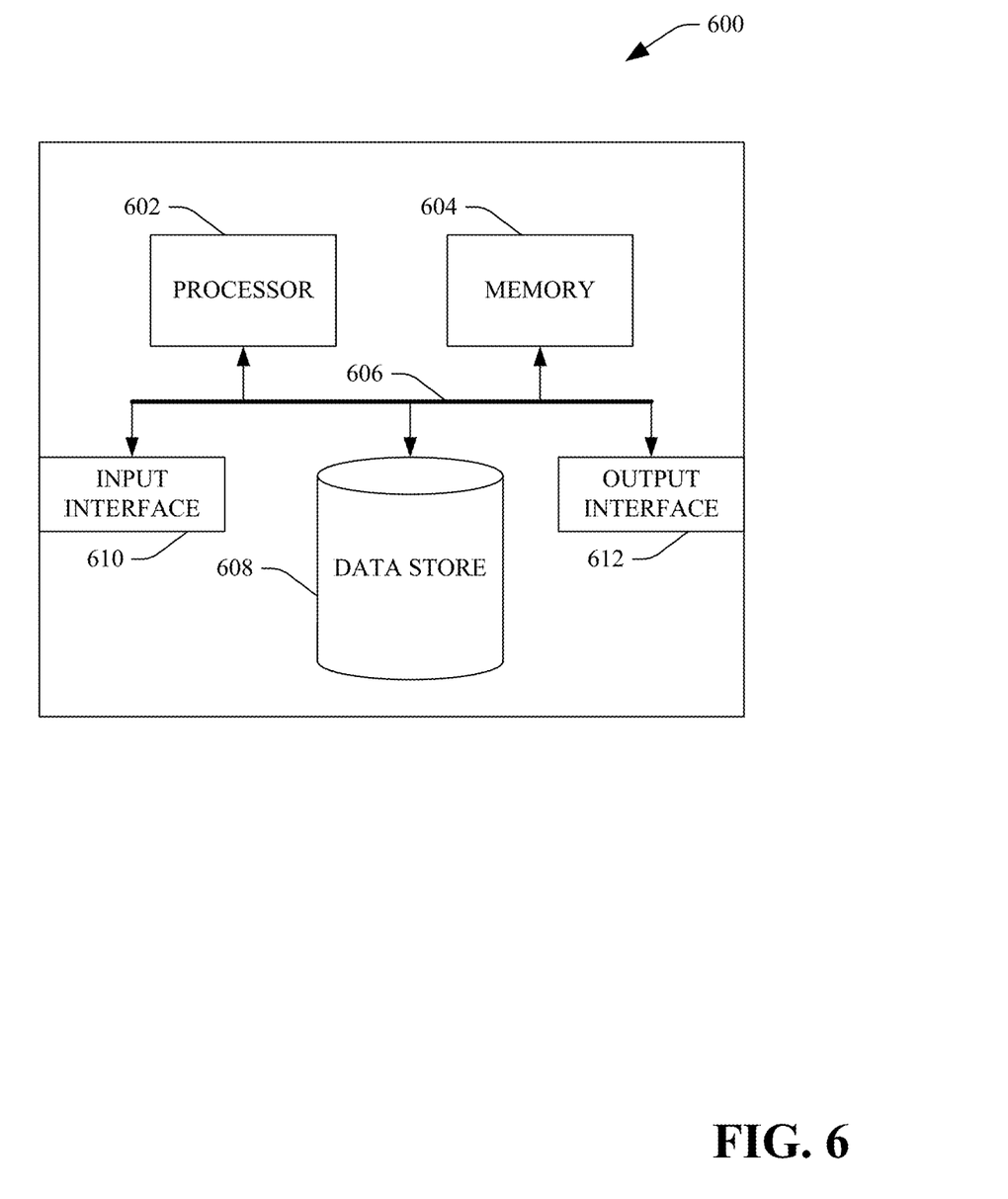
FIG. 6 is an exemplary computing system.

Now referring to FIG. 6, a high-level illustration of an exemplary computing device 600 that can be used in accordance with the systems and methodologies disclosed herein is illustrated. For instance, the computing device 600 may be used in a system that supports registering triggers set by location-based applications. In another example, at least a portion of the computing device 600 may be used in a system that supports determining that a registered trigger has been satisfied by comparing location data received from a mobile computing device with location constraints. The computing device 600 includes at least one processor 602 that executes instructions that are stored in a memory 604. The memory 604 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store triggers, user items, content items, application-specific attributes, etc.

The computing device 600 additionally includes a data store 608 that is accessible by the processor 602 by way of the system bus 606. The data store may be or include any suitable computer-readable storage, including a hard disk, memory, etc. The data store 608 may include executable instructions, user items, content items, triggers, application-specific attributes, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

Additionally, while illustrated as a single system, it is to be understood that the computing device 600 may be a distributed system. Thus, for instance, several devices may be in communication by way of a network connection and may collectively perform tasks described as being performed by the computing device 600.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A mobile computing device comprising:
   a sensor;
   a processor; and
   memory that stores instructions that, when executed by the processor, cause the processor to perform acts comprising:
      retrieving, from the sensor on the mobile computing device, location data, wherein the location data is indicative of a current location of the mobile computing device;
      based upon the location data, determining whether the location data satisfies a location constraint defined by an application installed on the mobile computing device, wherein the application is prevented from receiving the location data output by the sensor; and
      only when it is determined that the location data satisfies the location constraint, transmitting a callback to the application, wherein the callback indicates to the application that the location data satisfies the location constraint.

2. The mobile computing device of claim 1 being a mobile telephone.

3. The mobile computing device of claim 1, the acts further comprising:
   prior to requesting the location data from the sensor, receiving the location constraint from the application.

4. The mobile computing device of claim 1, wherein the acts of requesting, determining, and transmitting are performed by an operating system installed on the mobile computing device.

5. The mobile computing device of claim 1, wherein the location data is in a first format, the location constraint is in a second format, the acts further comprising:
   responsive to retrieving the location data, converting the location data from the first format to the second format, wherein determining whether the location data satisfies the location constraint is performed after the location data has been converted from the first format to the second format.

6. The mobile computing device of claim 5, wherein the first format is latitude/longitude coordinates, and wherein the second format is an address.

7. The mobile computing device of claim 1, wherein the sensor is a global positioning system sensor.

8. The mobile computing device of claim 1, the acts further comprising:
   determining, for each of a plurality of applications installed on the mobile computing device, whether the location data satisfies location constraints respectively defined by the plurality of applications, wherein the applications are prevented from receiving the location data output by the sensor; and
   transmitting callbacks to each application whose location constraint has been satisfied by the location data while refraining from transmitting callbacks to applications in the plurality of applications whose location constraints have not been satisfied by the location data.

9. The mobile computing device of claim 1, wherein location data is retrieved from the sensor at a frequency that is dependent upon an amount of estimated charge of a battery of the mobile computing device.

10. The mobile computing device of claim 1, wherein the location constraint defines a distance between the mobile computing device and a second location, and further wherein the location data satisfies the location constraint only when the location data indicates that the mobile computing device is within the threshold distance to the second location.

11. The mobile computing device of claim 10, wherein the application is a social networking application, and further wherein the second location is a location of a contact of a user of the mobile computing device in the social networking application.

12. A method executed by a mobile computing device, the method comprising:
   requesting location data from a sensor of the mobile computing device, the location data indicative of a current geographic location of the mobile computing device;
   responsive to requesting the location data, receiving the location data;
   based upon the location data, determining that the location data satisfies a location constraint defined by an application installed on the mobile computing device, wherein the application is prevented from receiving the location data; and
   only responsive to determining that the location data satisfies the location constraint, issuing a callback to the application, wherein the callback informs the application that the location data satisfies the location constraint.

13. The method of claim 12, wherein the location constraint identifies a second location, and further wherein determining that the location data satisfies the location constraint comprises:
   based upon the location data, comparing the current geographic location of the mobile computing device with the second location, wherein the location data satisfies the location constraint when a distance between the current geographic location of the mobile computing device and the second location is beneath a threshold.

14. The method of claim 12, wherein the location constraint identifies a geographic region, the current geographic location is within the geographic region, and further wherein the callback issued to the application causes the application to assign a tag to content, the tag identifies the geographic region.

15. The method of claim 12, wherein the location data has a first format, the location constraint specifies a second format that is different from the first format, the method further comprising:
   subsequent to receiving the location data and prior to determining that the location data satisfies the location constraint, converting the location data such that the location data has the second format.

16. The method of claim 12, wherein the acts of requesting, receiving, determining, and issuing are performed by an operating system of the mobile computing device.

17. The method of claim 12, wherein the mobile computing device is a mobile telephone.

18. The method of claim 12, further comprising:
   determining, for each of a plurality of applications installed on the mobile computing device, whether the location data satisfies location constraints respectively defined by the plurality of applications, wherein the applications are prevented from receiving the location data; and issuing callbacks to each application whose location constraint has been satisfied by the location data while refraining from transmitting callbacks to applications in the plurality of applications whose location constraints have not been satisfied by the location data.

19. A computer-readable storage medium of a mobile computing device, the computer-readable storage medium has instructions stored thereon that, when executed by a processor, cause the processor to perform acts comprising:

retrieving, from the sensor on the mobile computing device, location data, wherein the location data is indicative of a current location of the mobile computing device;

based upon the location data, determining whether the location data satisfies a location constraint defined by an application installed on the mobile computing device, wherein the application is prevented from receiving the location data output by the sensor; and only when it is determined that the location data satisfies the location constraint, transmitting a callback to the application, wherein the callback indicates to the application that the location data satisfies the location constraint.

20. The computer-readable storage medium of claim 19, wherein the location constraint defines a geographic region, and further wherein the location data satisfies the location constraint when the current location of the mobile computing device is within the geographic region.

* * * * *